UNITED STATES PATENT OFFICE.

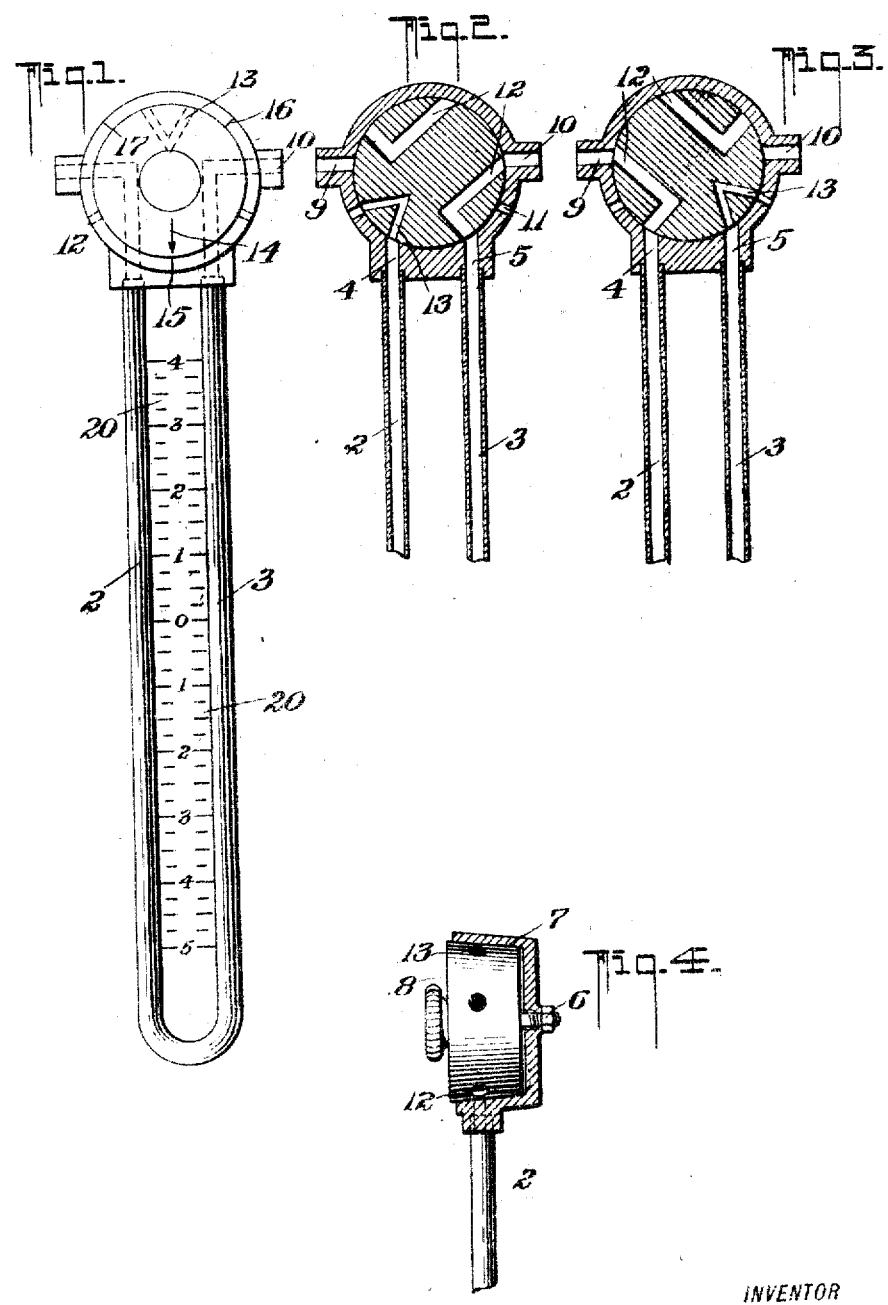

WALTER THOMAS, OF VANCOUVER, BRITISH COLUMBIA, CANADA.

GAS-PRESSURE GAGE.

No. 913,321.　　　Specification of Letters Patent.　　　Patented Feb. 23, 1909.

Application filed May 14, 1908. Serial No. 432,917.

*To all whom it may concern:*

Be it known that I, WALTER THOMAS, a citizen of the Dominion of Canada, residing at Vancouver, in the Province of British Columbia, Canada, have invented a new and useful Improvement in Gas - Pressure Gages, of which the following is a specification.

This invention relates to a gas pressure gage of that class wherein the difference in level of water or other medium in a U tube is used to determine the pressure of the gas admitted to the tube, and my object has been to provide a means whereby gas from two different sources may be admitted to the opposite sides of the U tube, that the difference of pressure may be ascertained; or the gas from one or the other source may be admitted to either one or the other side of the U tube while the opposite side is opened to the atmosphere, that the pressure from either source may be determined.

The invention is fully described in the following specification, reference being made to the drawings by which it is accompanied, in which:

Figure 1 is a front elevation of the gage, Figs. 2 and 3, sections of the head valve parallel to the front showing the valve in two positions and, Fig. 4, a vertical section of the same on the line A A in Fig. 1.

In these drawings 2 and 3 represent the two sides of the usual U tube of glass which contains the water or other medium, by which the gas pressure is measured and indicated, and 20 a graduated scale between the two sides of the U tube marked in inches and fractions above and below the zero point or water level. Instead of connecting the upper ends of the U in the usual manner direct to the gas supply of which it is required to determine the pressure, they are connected to two ports 4 and 5 of a valve body 7 which is bored slightly conical to receive a rotatable valve plug 8 retained within the body 7 by a screw 6 at the back.

On each side of the valve body 7 are gas admission ports 9 and 10 at a distance from the ports 4 and 5, to which the ends of the U tube are connected, corresponding to the distance between these ports, and between the U tube connections 4 and 5 and the apertures 9 and 10 are small apertures 11 direct to the atmosphere.

The rotatable valve plug 8 is provided with two ports 12, one on each side, which, when the valve is in the central position as shown in Fig. 1 of the drawing, will connect the gas admission ports 9 and 10 to the U tube ports 4 and 5; and between the upper ends of the ports 12 is a V port 13, the distance between the ends of which corresponds to the distance between the U tube connection ports 4 or 5 and their respective atmospheric apertures 11 on each side.

The location of the ports in the valve body and plug just described may be indicated by lines or color on the exposed front face of each and the various positions of the plug may be further indicated by a line 14 on the plug and lines 15, 16 and 17 on the face of the body.

The operation of the device is as follows: When the valve plug 8 is turned to the position shown in Fig. 1 with the indicating line 14 of the plug in line with the mark 15 of the body, the ports 12 of the plug will connect the inlet ports 9 and 10 of the body respectively with 4 and 5 of the U tube and the gas which is admitted at 9 and 10 acting on the liquid within the U tube will indicate on the scale 20 the difference of pressure between the two sources of supply. If again the plug be turned to bring the indicating line 14 to the mark 16 as represented in Fig. 2, the inlet 10 will be connected by one of the ports 12 to one side 5 of the U tube while the port 13 will admit the atmospheric pressure from 11 to the other port 4 of the U tube, and the gage will indicate the gas pressure admitted at 10. Similarly when the indicating pointer 14, as in Fig. 3, is turned to the mark 17 the other inlet 9 will be connected to the other port 4 of the U tube and the atmosphere will be admitted through 13 to the opposite side through the port 5. Thus practically three gages are combined in one by a simple and effective device which may without difficulty be applied to any existing gage, for the ports 4 and 5 may be connected to the ends of an existing U tube by short lengths of rubber tube.

Having now particularly described my invention and the manner of its use, I hereby declare that what I claim as new and desire to be protected in by Letters Patent, is:

1. In a gas pressure gage, in combination with a U tube fluid pressure gage, of means for simultaneously admitting gas from two different sources of supply to the opposite ends of the U tube, said means also including provisions for admitting gas from either source of supply to one or the other side of the U tube and simultaneously opening one side of the U tube to the atmosphere.

2. In a gas pressure gage, the combination with a U tube fluid pressure gage, of a valve the body of which is provided with ports to which the ends of the U tube may be connected and ports to which gas from two different sources of supply may be admitted and ports between these to the atmosphere the plug of said valve having ports that will when in one position connect the gas supply ports to the U tube ports and that will in other positions connect one or the other of the gas supply ports to one or the other U tube ports while connecting the other U tube port to the atmosphere port.

3. In a gas pressure gage of the class described, the combination with a U tube fluid pressure gage, of a valve body having ports to which the ends of the U tube may be connected and ports to which gas from two different sources of supply may be admitted, a valve plug fitting said body and having a port on each side connecting each gas supply port with each U tube port, a port in the body between each U tube port and each gas supply port and a port in the valve plug which when the plug is turned to connect one of the gas supply ports to one of the U tube ports will connect the other U tube port to the atmosphere through the port therefor in the body.

In testimony whereof I have signed my name to this specification in the presence of two subscribing witnesses.

WALTER THOMAS.

Witnesses:
 ROWLAND BRITTAIN,
 CLIVE S. CARMAN.